United States Patent
Pecen et al.

(10) Patent No.: US 6,466,804 B1
(45) Date of Patent: Oct. 15, 2002

(54) METHOD AND APPARATUS FOR REMOTE MULTIPLE ACCESS TO SUBSCRIBER IDENTITY MODULE

(75) Inventors: Mark E. Pecen, Rolling Meadows, IL (US); Niels P. Skov Andersen, Roskilde (DK); Michael D. Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 37 days.

(21) Appl. No.: 09/648,955

(22) Filed: Aug. 25, 2000

(51) Int. Cl.$^7$ ................................................. H04M 1/00
(52) U.S. Cl. ....................................... 455/558; 455/411
(58) Field of Search .............................. 455/551, 557, 455/558, 422, 423, 424, 425, 428, 466, 426, 550, 575, 556, 411; 379/88.28, 144.04; 370/313, 328

(56) References Cited

U.S. PATENT DOCUMENTS

| | | | |
|---|---|---|---|
| 5,457,680 A | * 10/1995 | Kamm et al. ................... 370/17 |
| 6,092,133 A | * 7/2000 | Erola et al. ................... 710/102 |
| 6,198,920 B1 | * 3/2001 | Diviak et al. ............... 455/426 |
| 6,202,008 B1 | * 3/2001 | Beckert et al. ............... 701/33 |
| 6,226,623 B1 | * 5/2001 | Schein et al. ................. 705/35 |
| 6,230,002 B1 | * 5/2001 | Floden et al. ............... 455/411 |
| 6,311,165 B1 | * 10/2001 | Coutts et al. ................. 705/21 |

OTHER PUBLICATIONS

"Digital cellular telecommunications system (Phase 2+); General Packet Radio Service (GPRS); Service Description; Stage 1", (European Telecommunications Standards Institute (ETSI), European Standard (Telecommunications series).

"Digital cellular telecommunications system (Phase 2+); Specification of the Subscriber Identity Module—Mobile Equipment (SIM—ME) interface", (European Telecommunications Standards Institute, (ESTI) Global System for Mobile Communications (GSM) specifications).

* cited by examiner

Primary Examiner—Edward F. Urban
Assistant Examiner—Charles Craver
(74) Attorney, Agent, or Firm—Michael C. Soldner; Randall S. Vaas (57) ABSTRACT

An apparatus enabling multiple client devices to access a SIM card, coupled to a server device, along a local link, that includes a SIM card interface and a router unit. The SIM card interface couples the SIM card to the server device, formats the commands from the client devices for transmission to the SIM card, and formats responses to the commands for transmission from the SIM card to the client devices. The router unit routes the commands from the server device to the SIM card interface, and routes the responses to the commands for transmission along the local link from the SIM card to the client devices. A broadcast message is transmitted by the router unit along the local link to the client devices in response to detecting a physical presence signal transmitted by the SIM card interface in response to the SIM card being coupled to the SIM card interface.

39 Claims, 6 Drawing Sheets

METHOD AND APPARATUS FOR REMOTE MULTIPLE ACCESS TO SUBSCRIBER IDENTITY MODULE

FIELD OF THE INVENTION

The present invention relates generally to mobile telecommunications systems utilizing a subscriber information module, and in particular, the present invention relates to a method and apparatus for remote multiple access to services of a subscriber identity module card by multiple subscriber devices in a GSM system.

BACKGROUND OF THE INVENTION

In a Global System for Mobile Communications (GSM) system and in other telecommunications systems, a mobile device includes hardware and software specific to a radio interface, along with subscriber specific data located in a subscriber identity module, or "SIM". The SIM can either be a smart card having physical dimensions similar to the well-known size of credit cards, or alternately can be "cut" to a much smaller format, commonly referred to as a "plug-in SIM". In either case, the SIM card contains and organizes information, such as identity information identifying the subscriber as a valid subscriber, subscriber supplied information, such as telephone numbers, for example, operator specific information, and a certain subset of mobility management state information, such as information about the last public land mobile network in which the mobile device was registered. In this way, when inserted within a mobile device in a cellular network, the SIM card enables the mobile device to be personalized, or associated with subscriber specific information. However, once the SIM card is removed, the mobile device cannot be used, except, if permitted by the network, for emergency related transmissions.

Figure 1:
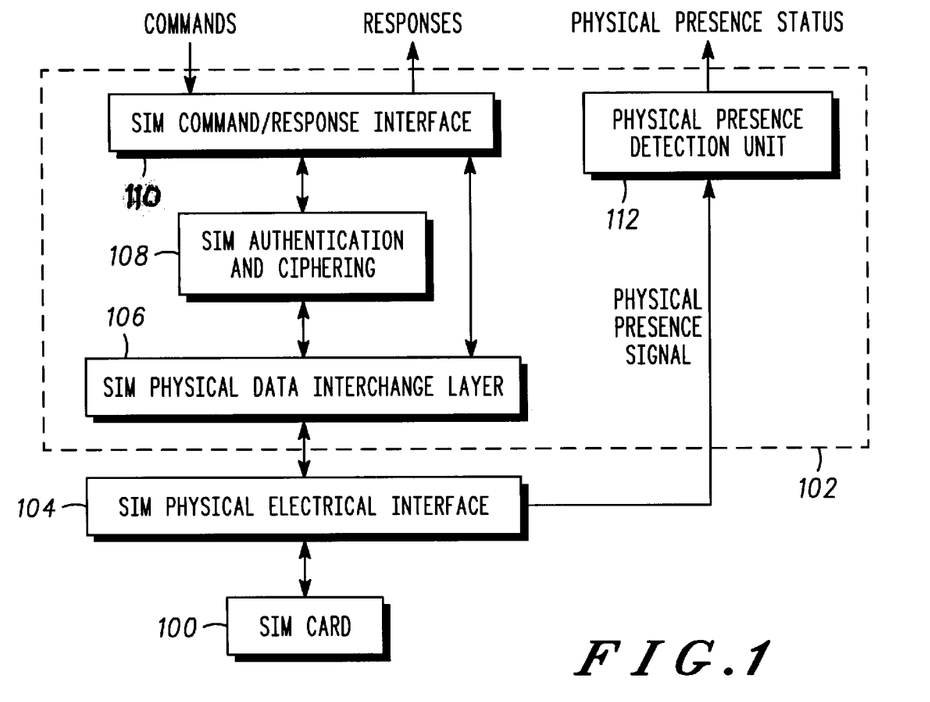
FIG. 1 (Prior Art) is a schematic diagram of known system architecture of a SIM card interface within a mobile device.

FIG. 1 (Prior Art) is a schematic diagram of known system architecture of a SIM card interface within a mobile device. As illustrated in FIG. 1, a SIM card 100 interfaces with a software component portion 102 of a mobile device through an electrical interface 104 that is coupled to a SIM physical data interchange layer 106 of software component portion 102. Software component portion 102 also includes a SIM authentication and ciphering unit 108, a SIM command/response interface 110, and a SIM physical presence detection unit 112.

Commands corresponding to authentication and ciphering requests that are received and transmitted internally by the mobile device are converted by SIM command/response interface 110 to a standardized command format. The standardized command is then transmitted to SIM authentication and ciphering unit 108 for authentication and cipher key generation, and is then transmitted to SIM physical data interchange layer 106. Commands corresponding to requests other than authentication and ciphering requests that are received and transmitted internally by the mobile device are converted by SIM command/response interface 110 to a standardized command format, and the standardized command is then transferred directly to physical data interchange layer 106. Physical data interchange layer 106 formats the standardized command received from either SIM authentication and ciphering unit 108 or directly from SIM command/response interface 110 into physical data according to GSM required electronic signals and transmission protocols. The physical data is then transmitted from SIM physical data interchange layer 106 to SIM card 100 through electrical interface 104.

Upon receiving the command, SIM card 100 subsequently transmits physical data corresponding to a response to the command from SIM card 100 to physical data interchange layer 106, through electrical interface 104. Physical data interchange layer 106 formats the physical data into a standardized response. The standardized response, if made in response to an authentication and ciphering command, is transmitted to SIM authentication and enciphering unit 108 for authentication and cipher key generation, and then to SIM command/response interface 110, which converts the standardized response to a format required internally by the mobile station. Standardized responses to commands corresponding to requests other than authentication and ciphering requests are transmitted directly from physical data interchange layer 106 to SIM command/response interface 110, which converts the standardized response to a format required internally by the mobile device.

Throughout the internal command and response generation process described above, electrical interface 104 continuously transmits a physical presence signal to a physical presence detection unit 112 to indicate that SIM card 100 is inserted and is in electrical contact with electrical interface, and that SIM card 100 is functioning properly. Once the physical presence signal is interrupted, such as when SIM card 100 has been removed or fails, and is therefore no longer detected by physical presence unit 112, physical presence detection unit 112 transmits an interrupt signal indicating the absence of SIM card 100, and service access to the mobile device is interrupted.

The SIM card, as defined by GSM specifications, has been further enhanced in terms of information organization and functionality for use with other services. For example, work for the Telecommunications Industry Association/Electronics Industry Association (TIA/EIA) 136 Enhanced General Packet Radio Services (EGPRS) for TIA/EIA 136 proposes the use of the European GSM SIM card plus enhancements for use by the American time division multiple access (TDMA) proposed high-speed wireless data service. The current GSM definition of the SIM card will likely be expanded to include other services as well, such as third generation mobile voice and data services.

One of the disadvantages that will result as the SIM card is utilized in more and more subscriber devices, is that a separate SIM card will be required for use in each subscriber device, and therefore a user of multiple SIM card enabled devices will be required to utilize a multiple number of SIM cards. Accordingly, what is needed is a method and apparatus that enables multiple SIM card enabled subscriber devices to be utilized using a single SIM card.

BRIEF DESCRIPTION OF THE PREFERRED EMBODIMENT

The features of the present invention which are believed to be novel are set forth with particularity in the appended claims. The invention, together with further objects and advantages thereof, may best be understood by making reference to the following description, taken in conjunction with the accompanying drawings, in the several figures of which like reference numerals identify like elements, and wherein:

DETAILED DESCRIPTION OF THE PREFERRED EMBODIMENT

Figure 2:
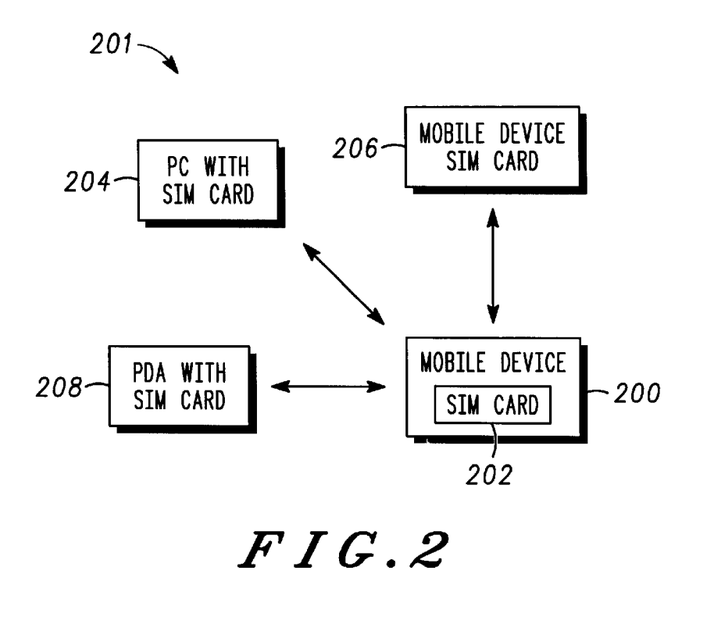
FIG. 2 is a schematic diagram of a communications system enabling remote multiple access to a single SIM card device, according to the present invention.

FIG. 2 is a schematic diagram of a communications system enabling remote multiple access to a single SIM card device, according to the present invention. As illustrated in FIG. 2, a communication system 201 according to the present invention includes a server device 200, such as a mobile subscriber unit, having a SIM card 202 intended for use by a single user inserted within server device 200. Other client devices, such as a personal computer 204, another mobile subscriber unit 206, and a personal digital assistant (PDA) 208, which are intended to operate utilizing a SIM card, interface with server device 200 via local links 210. According to the present invention, local links 210 can be hardwire connections or wireless connections, such as Bluetooth links, pico-radio, or other known wireless transmission technology. Therefore, although the present invention will be described below as utilizing a wireless local link for transmitting commands and responses between server device 200 and client devices 204, 206 and 208, it is understood that the present invention could also be realized using a hardwire connection as local link 210.

Server device 200 may be a mobile subscriber unit that is intended for General Packet Radio Service (GPRS) data interchange, while mobile subscriber unit 206 may be capable of voice-only service. It is understood that while three client devices 204, 206 and 208 are shown in FIG. 2, the present invention is intended to include any number of and/or variety of client devices that utilize a SIM card.

According to the present invention, each of client devices 204, 206 and 208 is able to access SIM card 202 in server device 200 via wireless link 210, as will be described below, thereby alleviating the need for a separate SIM card to be inserted within each of client devices 204, 206 and 208. As a result, by enabling remote, multiple access to the services of a single SIM card by multiple subscriber devices, the present invention enables GSM and Universal Mobile Telephone System (UMTS) operators to offer their customers multiple services, or services that would span more than one physical terminal unit, with provisioning of a single SIM card. Since the range of the wireless local link 210 is limited, the operator has a built-in device which limits the usage of the multiple subscriptions to a single user, or to a very small multi-user environment.

Figure 3A:
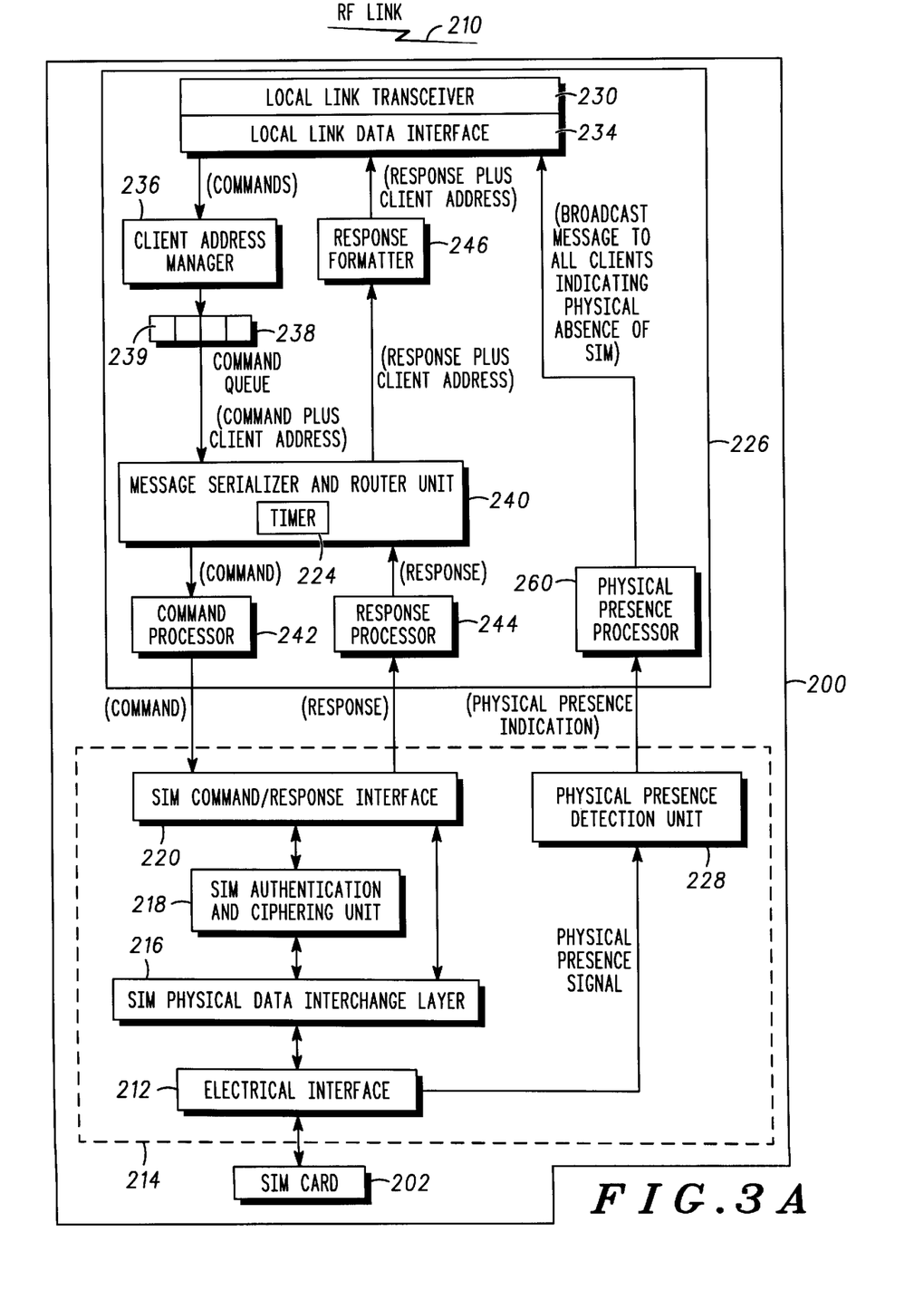
FIG. 3A is a schematic diagram of system architecture of a server device enabling remote multiple access to a SIM card, according to the present invention.

FIG. 3A is a schematic diagram of system architecture of a server device enabling remote multiple access to a SIM card, according to the present invention. As illustrated in FIGS. 2 and 3A, in addition to SIM card 202, server device 200 includes a SIM card interface 214 and a router unit 226. An electrical interface 212 enables hardware associated with SIM card 202 to interface with SIM card interface 214 of server device 200. SIM card interface 214 includes a SIM physical data interchange layer 216 that receives electrical signals from electrical interface 212, and a SIM authentication and ciphering unit 218 which establishes an authenticated connection prior to the provision of information services to client devices 204, 206 and 208.

A SIM command/response interface 220 of SIM card interface 214 receives commands from router unit 226 and converts response information, formatted internally by SIM card interface 214, to standardized responses which are sent to a router unit 226. In addition, SIM card interface 214 includes a physical presence detection unit 228 that receives an electrical signal transmitted directly from electrical interface 212 when SIM card 202 is inserted within server device 200 to indicate the physical presence of SIM card 202 within server device 200. As long as the physical presence signal is detected, physical presence detection unit 228 continuously transmits a physical presence indication signal to a physical presence processor 260 of router unit 226. When SIM card 202 is not inserted in server device 200, receipt of the physical presence indication signal from physical presence detection unit 228 is interrupted, and physical presence processor 260 transmits a broadcast message along local link 210 through a local link transceiver 230. In this way, server device 200 transmits the broadcast message to each of client device 204, 206 and 208 that are currently attached to server device 200 via local link 210, indicating that SIM card 202 is not electrically coupled at electrical interface 212 of SIM interface 214 of server device 200.

Local link transceiver 230 within router unit 226 performs local link and address management and authentication to enable data to be interchanged via local link 210, between server device 200 and any one of multiple client devices 204, 206 and 208. A local link data interface 234 performs bidirectional conversion of commands from client devices 204, 206 and 208 that are received by router unit 226, and of responses transmitted from router unit 226 to client devices 204, 206 and 208 to a message format that is meaningful and useful to a client address manager 236 and local link transceiver 230, respectively. Local link data interface 234 formats the commands from local link transceiver 230 and converts the responses to the commands from SIM card 202 and the broadcast message from physical presence processor 260 to a format corresponding to local link transceiver 230, and local link transceiver 230 transmits the responses to the commands from local link data interface 234 to client devices 204, 206 and 208 along local link 210.

Client address manager 236 receives commands from data interface 234, associates the commands with a local link address to determine whether the client devices from which the commands originated are permitted client devices 204, 206 and 208, and determines whether a number of allowed remote SIM clients has been exceeded by server device 200. In this way, valid commands are formed when the commands are determined to originate from permitted client devices 204, 206 and 208, and server device 200 has service capacity, as provisioned by a service provider. As a result, if a command is received and server device 200 is serving a maximum number of client devices 204, 206 and 208, or a client device associated with the command is not permitted service, the command is discarded by server device 200.

In addition, server device 200 includes a maximum response timer 224 that determines the amount of time between the transmission of commands by router unit 226 to SIM card 202, and receipt of responses to the commands from SIM card 202. If timer 224 exceeds a predetermined amount of time, the commands are discarded. Although timer 224 is shown in FIG. 3A as being located in message serializer and router unit 240 it is understood that, according to the present invention, timer 224 may be positioned at other locations within router unit 226.

As commands are received by client address manager 236, the received commands are stored in order of receipt in a command queue buffer 238, with the first command received being located at a head 239 of command queue 238. The received commands are each processed individually by a message serializer and router unit 240, as described below, and the processed commands are sent from message serializer and router unit 240 to a command processor 242. Command processor 242 formats the commands and sends a corresponding command to SIM card 202 via command/response interface 220, SIM authentication and ciphering unit 218, data interchange layer 216, and electrical interface 212.

A response processor 244 receives and formats a response to the command from SIM card 202 via command/response interface 220, and sends the response to message serializer and router 240. Message serializer and router 240 associates the response with client device address information, and transmits the response to a response formatter 246. Response formatter 246 formats and converts the response and the associated address to a response message that is transmitted to data interface 234 and sent to client devices 204, 206 and 208 corresponding to the associated address via local link 210 by transceiver 230.

Figure 3B:
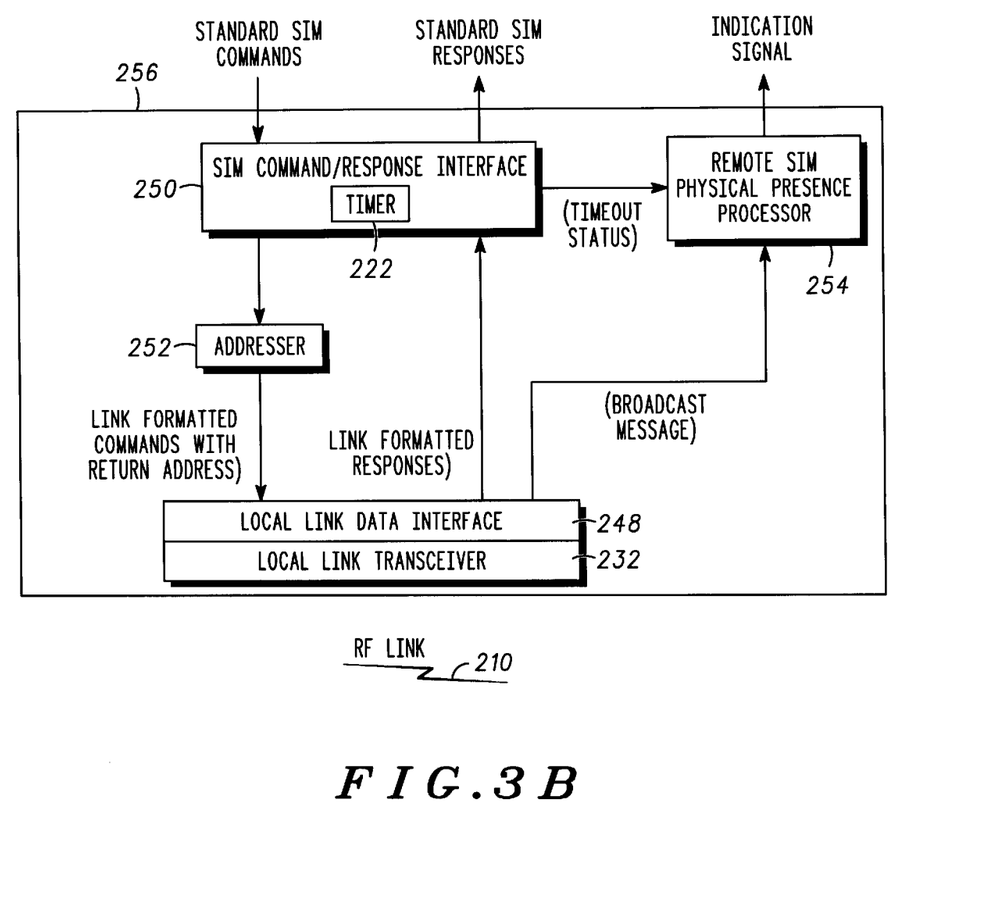
FIG. 3B is a schematic diagram of system architecture of a client device, according to the present invention.

FIG. 3B is a schematic diagram of system architecture of a client device, according to the present invention. It is understood that, according to the present invention, each of client devices 204, 206 and 208 is capable of interfacing with server device 200, as illustrated in FIG. 2. However, since client devices 204, 206, and 208 each include system architecture corresponding to the present invention, only one client device 256 is shown in FIG. 3B, merely to simplify the discussion, and the description of client device 256 therefore is intended to describe features associated with each of client devices 204, 206, and 208.

As illustrated in FIGS. 2–3B, a local link data interface, 248 of client device 256 performs bidirectional conversion of internal messages to and from router unit 226 through a local link transceiver 232 in a message format that is meaningful and useful to router unit 226 and to a command/response interface 250 of client device 256. Transceiver 232 performs local link and address management and authentication of the broadcast message and the responses to the commands received along local link 210 from server device 200 via transceiver 230. Data interface 248 converts the commands from addresser 252 to a format corresponding to transceiver 232 to enable transceiver 232 to transmit the commands from data interface 248 to transceiver 230 of server device 200 along local link, and converts the broadcast message and the responses to the commands from SIM card 202 to a format corresponding to command response interface 250.

Command/response interface 250 converts command and response information that has been formatted internally by client device 256 to standardized commands and responses specified for SIM card interchange. In this way, command/response interface 250 converts internal information to form the commands, and links the responses to the commands from SIM card 202 with the internal information. The standard SIM commands from command/response interface 250 are received by an addresser 252, which associates a local client address to the command. The commands are then output by transceiver 232 of client device 256 along local link 210, and are received through transceiver 230 by router unit 226 and routed to SIM card 202 through electrical interface 212.

Client device 256 includes a remote SIM physical presence processor 254 that receives the broadcast message transmitted along local link 210 from server device 200 in response to SIM card 202 not being electrically coupled at electrical interface 212 of SIM interface 214 of server device 200. In this way, if SIM card 202 is removed from server device 200, or a SIM card failure has occurred, physical presence detection unit 228 will not received the physical presence signal from electrical interface 212, so that the transmission of the physical presence indication signal to physical presence processor 260 will be interrupted, thereby causing the broadcast message to be transmitted from physical presence processor 260 to physical presence processor 254, which in turn transmits the indication signal informing client device 256 of the absence or failure of SIM card 202. As a result, the present invention enables SIM card 202 to appear as though it resides on client device 256.

A maximum response timer 222 determines the amount of time between the commands being transmitted by client devices 204, 206 and 208 along local link 210 to server device 200, and receipt of the responses to the commands from SIM card 202 transmitted along local link 210 from router unit 226. If timer 224 exceeds a predetermined period of time, timer 222 transmits a timeout message to physical presence processor 254, which then transmits the indication signal informing client device 256 of the absence or failure of SIM card 202. In this way, physical presence processor 260 detects the presence of the actual SIM card 202, and if SIM card 202 is removed from server device 200, physical presence processor 260 transmits the broadcast message, via wireless link 210, to all client devices 204, 206 and 208 informing of the absence of SIM card 202. Remote physical absence processor 254 of each client device 204, 206 and 208 transmits an indication signal, upon receipt of the broadcast message form physical presence processor 260 or the timeout message from timer 222, internally indicating to client devices 204, 206 and 208 that SIM card 202 was removed from server device 200, or that server device 200 has not responded to a command within a predetermined period of time. As a result, SIM card 202 appears logically to client device 256 as SIM card 202 resides within client device 256.

Figure 4:
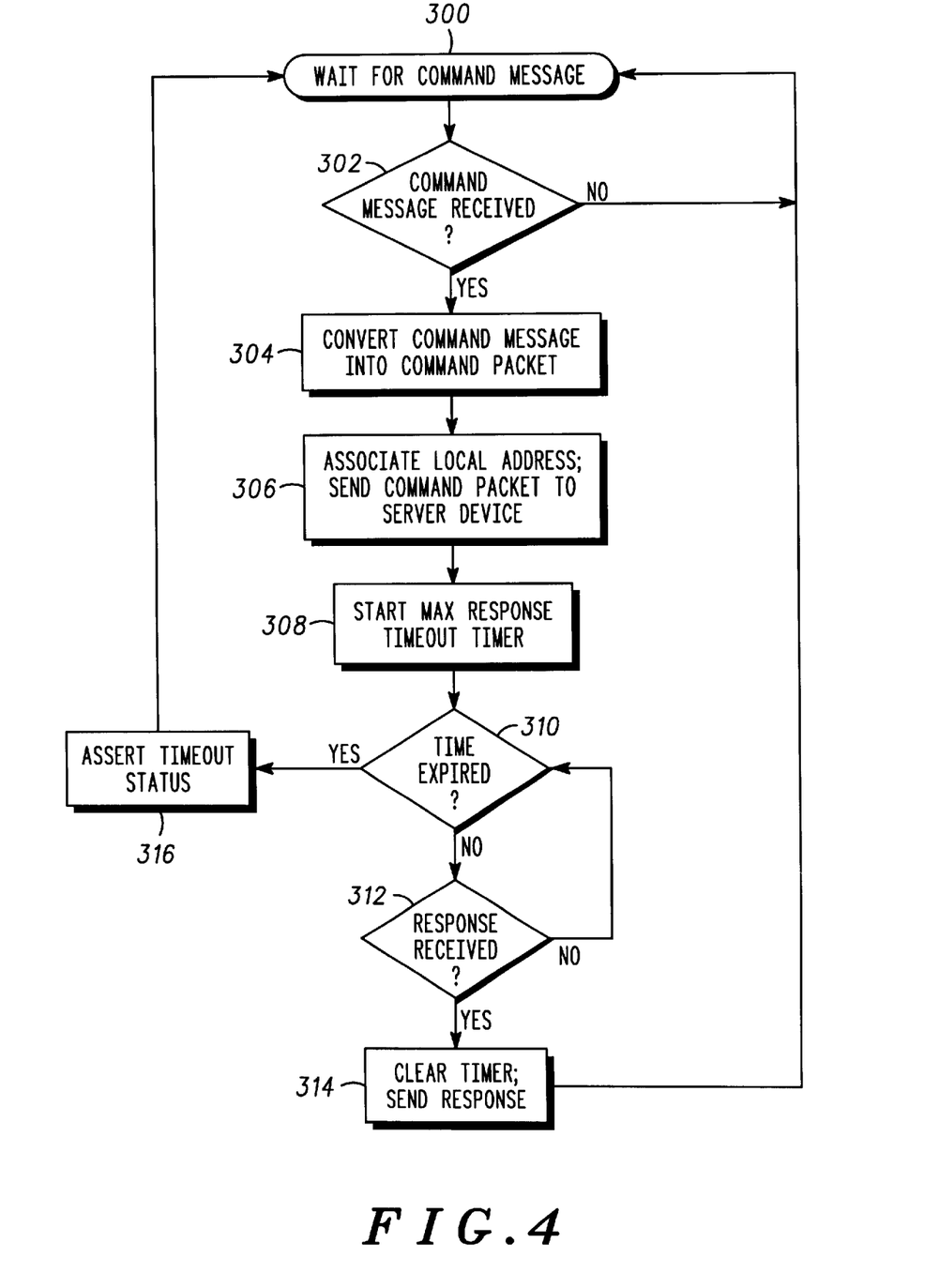
FIG. 4 is a flowchart of processing of a SIM command message by a remote client device, according to the present invention.

FIG. 4 is a flowchart of processing of a SIM command message by a remote client device, according to the present invention. As illustrated in FIGS. 3A, 3B and 4, according to the present invention, client device 256 waits to receive an internal SIM command message, Step 300, and once a SIM command message is received, Step 302, the received SIM command message is converted by command response interface 250 into a command packet, Step 304, that is usable by interface 248. The command packet is transmitted to addresser 252, which associates a local address identifying client device 256 with the command packet, and the command packet and local address is then transmitted to server device 200 via local link 210 and transceivers 230, 232 in Step 306. Once the command packet has been transmitted to server device 200 in Step 306, maximum response timeout timer 222 positioned within client device 256 is started, Step 308, to keep track of the amount of time between the sending of the command packet to server device 200 and receipt of a response to the command from SIM card 202 from server device 200.

A determination is made in Step 310 as to whether maximum response timeout timer 222 has expired, i.e., whether the amount of time between the sending of the command packet to server device 200 and receipt of a response to the command message from server device 200 is greater than or has exceeded a predetermined amount of time. If timer 222 has not exceeded the predetermined time period, a determination is then made as to whether a response from server device 200 to the command packet from SIM card 202 has been received by client device 256 from server device 200, Step 312. If a response has not been received, the process returns to Step 310.

If it is determined that timer 222 has not expired and a response has been received, timer 222 is cleared and the received response is transmitted internally within client device 256 via command response interface 250, Step 314. However, if, prior to determining in Step 312 that a response has been received, it is determined in Step 310 that maximum response timeout timer 222 has exceeded the predetermined time period, a timeout status is asserted to remote physical absence processor 254 in Step 316, which in turn internally signals client device 256 to indicate to client device 256 that there was a response failure.

Figure 5:
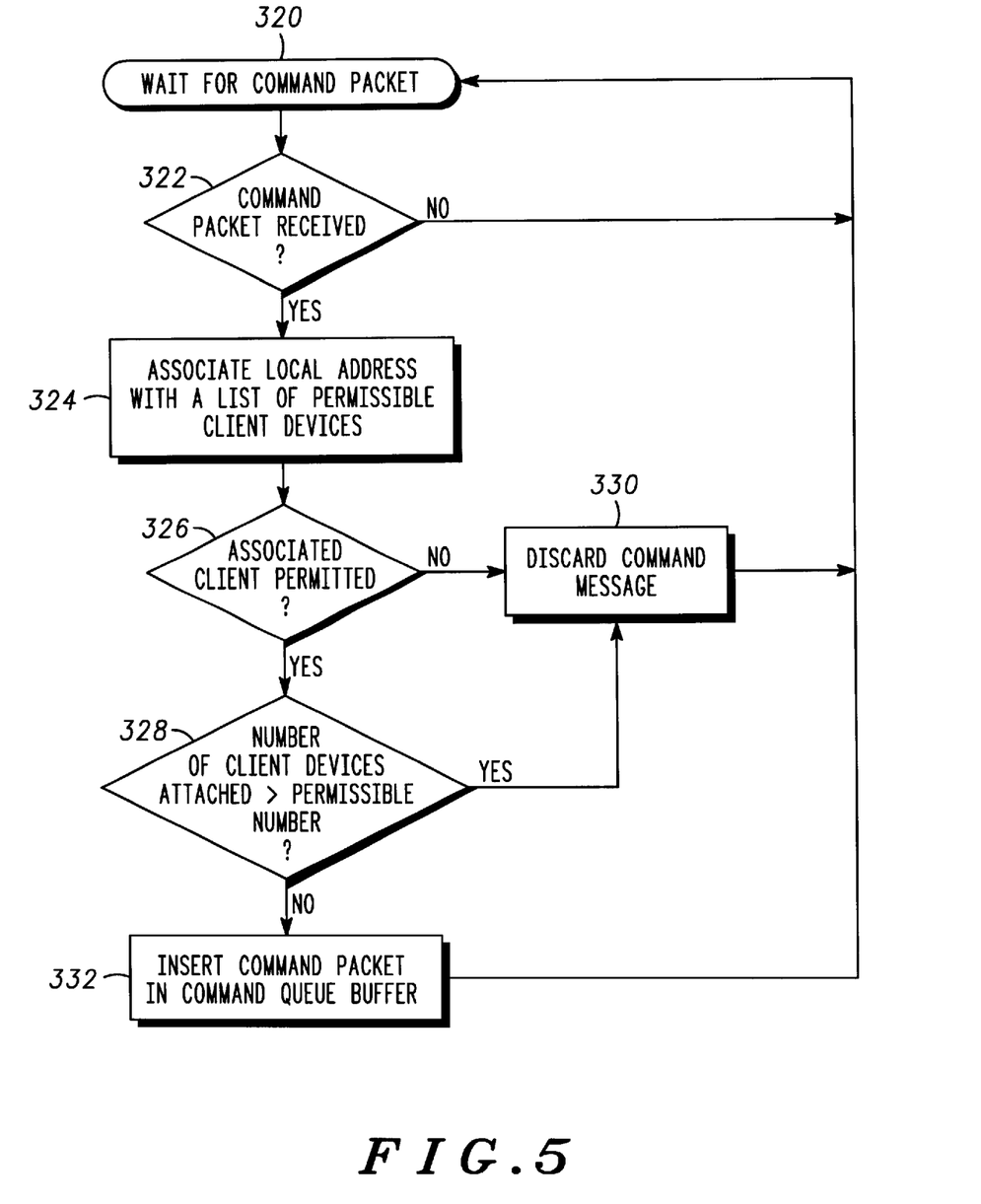
FIG. 5 is a flowchart of processing a SIM command received by a server device, according to the present invention.

FIG. 5 is a flowchart of processing of a SIM command received by a server device, according to the present invention. As illustrated in FIGS. 3 and 5, according to the present invention, client address manager 236 waits to receive a command packet from client device 256, Step 320, and once a command packet is received, Step 322, client address manager 236 compares the local link address previously associated by addresser 252 with a list of permissible client devices, Step 324. Based upon this comparison by client address manager 236, a determination is made as to whether client device 256 is included in the list of permissible client devices and is therefore a permitted device, Step 326, and as to whether server device 200 has more than a maximum number of permissible client devices currently attached, Step 328.

According to the present invention, the maximum number of permissible client devices can be controlled by the GSM or UMTS operator, enabling the operator to limit the number of remote connections permissible, and that the number could be zero, so that the operator could permit or deny remote SIM operation. According to the present invention, identification of the number of remote clients that SIM card 202 can support can be identified, for example, in an answer to reset, or ATR message, which is a response currently defined within GSM standards and in which there are currently several unused characters that are sent. Therefore, according to a preferred embodiment of the present invention, the identification of the number of remote clients that SIM card 202 can support is contained in an unused character of the ATR message. However, it is understood that the identification of the number of remote clients that SIM card 202 can support could be conveyed in other messages or by alternate procedures.

If it is determined in Step 326 that the associated client device is not permitted service, or if it is determined in Step 328 that server device 200 is currently serving a maximum number of client devices allowed for that server device, the command packet is discarded, Step 330 and the process returns to Step 320 to wait for receipt of a next command packet.

However, if it is determined in Step 326 that the associated client device is permitted service, and it is determined in Step 328 that server device 200 is not currently serving a maximum number of client devices allowed for that server device, the command packet, including the associated internal representation of the address of the command packet previously associated by addresser 252 is enqueued in command queue buffer 238 in Step 332, and the process returns to Step 320 to wait for receipt of a next command packet by client address manager 236.

Figure 6:
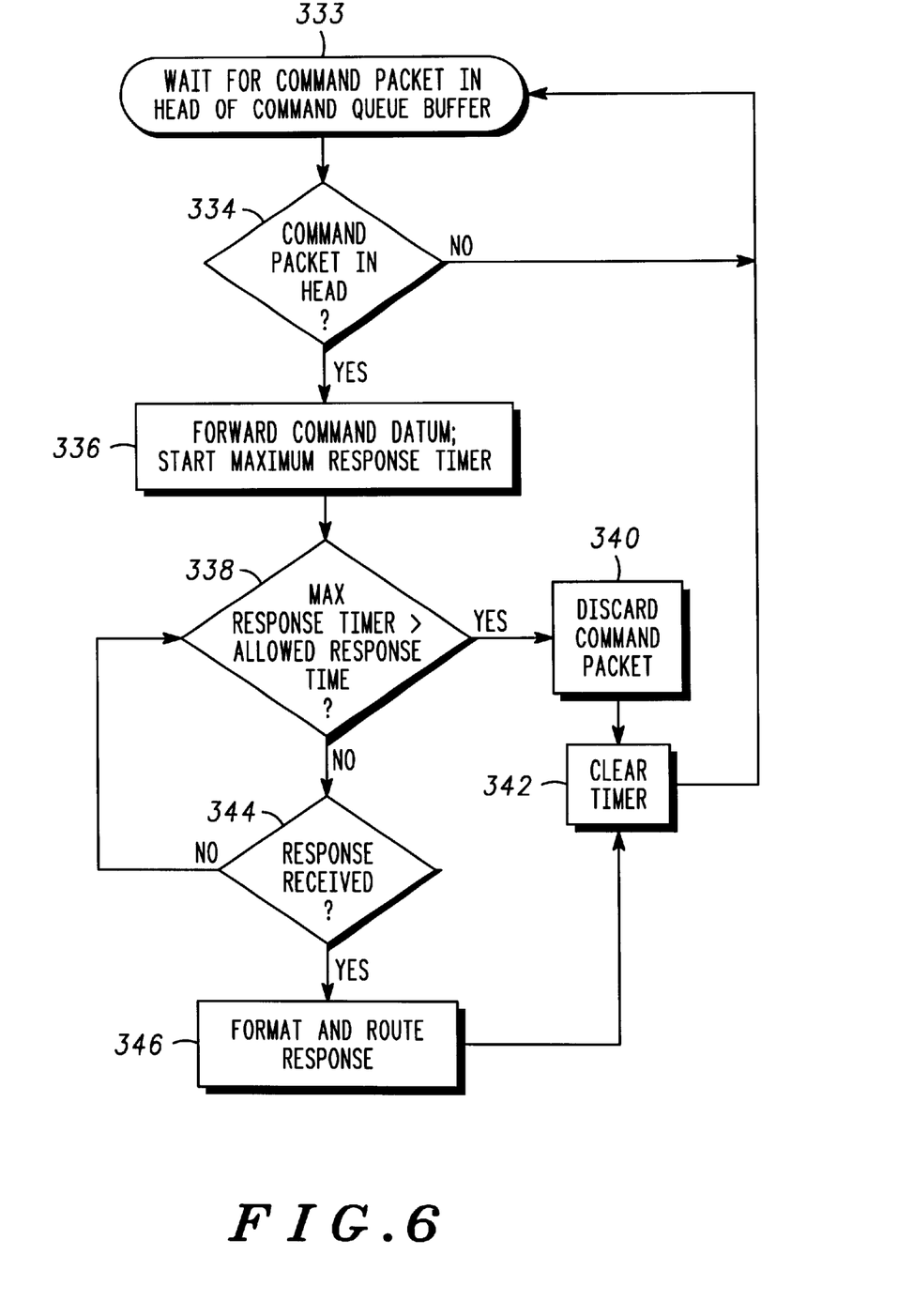
FIG. 6 is a flowchart of routing of a received SIM command by a server device, according to the present invention.

FIG. 6 is a flowchart of routing of a received SIM command by a server device, according to the present invention. As illustrated in FIGS. 3 and 6, according to the present invention, message serializer and router 240 waits for a command packet to be inserted at head 239 of command queue buffer 238, Step 333, and once a determination is made in Step 334 that command packet is in head 239 of command queue buffer 238, message serializer and router 240 removes the command packet from head 239 of command queue buffer 238, forwards the command packet to command processor 242, and starts maximum response timer 224, Step 336.

Maximum response timer 224 keeps track of the amount of time between transmission of the commands by router unit 226 to SIM card 202, and receipt of the responses to the commands from SIM card 202. In particular, timer 224 keeps track of the amount of time that expires between the forwarding of the command packet by message serializer and router 240 to command processor 242 and receipt of a response to the command packet by message serializer and router 240. Once timer 224 has been started, a determination is then made in Step 338 as to whether the time displayed by maximum response timer 224 is greater than a predetermined response time. If the time displayed by the maximum response timer 224 is greater than the predetermined response time, the command packet is discarded, Step 340, the timer is cleared, Step 342, and the process returns to Step 333 and waits for a next command packet in head 239 of command queue buffer 238, Step 334.

If it is determined in Step 338 that maximum response timer 224 is not greater than the predetermined response time, a determination is made in Step 344 as to whether a response to the command packet has been received. If a response has not been received, the process returns to Step 338 so that message serializer and router 240 waits until either a response is received, or until the amount of time that has expired since the command packet was forwarded to command processor 242 in Step 336 by message serializer and router 240 has exceeded a predetermined allowed response time. However, if timer 224 has not exceeded the predetermined allowed response time and it is determined in Step 344 that a response to the command packet was received, the response is formatted and routed to the requesting client device 256, Step 346, via response formatter 246, interface 234, and transceiver 230. Maximum. response timer 224 is then cleared, Step 342, and the process returns to Step 333 and waits for a next command packet in head 239 of command queue buffer 238, Step 334.

While a particular embodiment of the present invention has been shown and described, modifications may be made. It is therefore intended in the appended claims to cover all such changes and modifications that fall within the true spirit and scope of the invention.

What is claimed is:

1. A mobile telecommunications system for communicating with a plurality of client devices transmitting commands along a local link to a SIM card and receiving responses to the commands from the SIM card transmitted along the local link, comprising a server device transferring the commands from the local link to the SIM card, and transferring the responses to the commands from the SIM card for transmission along the local link, the server device transmitting a broadcast message in response to the SIM card not being electrically coupled to the server device, wherein the server receives an indication signal from the plurality of client devices in response to the transmitted broadcast message; and an addresser associating local link addresses with the commands transmitted from the plurality of client devices to the server device.

2. The mobile telecommunications system of claim 1, wherein the local link is a wireless local link.

3. A mobile telecommunications system for communicating with a plurality of client devices transmitting commands along a local link to a SIM card and receiving responses to the commands from the SIM card transmitted along the local link, comprising a server device transferring the commands from the local link to the SIM card, and transferring the responses to the commands from the SIM card for transmission along the local link, the server device transmitting a broadcast message in response to the SIM card not being electrically coupled to the server device, wherein the server receives an indication signal from the plurality of client devices in response to the transmitted broadcast message; and a client address manager determining whether local link addresses associated with the commands correspond to permitted client devices and whether a number of allowed client devices has been exceeded, to form valid commands.

4. The mobile telecommunications system of claim 3, wherein the number of allowed client devices is contained in an answer to reset response transmitted from SIM card to the plurality of client devices.

5. The mobile communications system of claim 3, further comprising a command queue buffer receiving and storing the valid commands formed by the client address manager in order of receipt.

6. A mobile telecommunications system for communicating with a plurality of client devices transmitting commands along a local link to a SIM card and receiving responses to the commands from the SIM card transmitted along the local link, comprising:

a server device transferring the commands from the local link to the SIM card, and transferring the responses to the commands from the SIM card for transmission along the local link, the server device transmitting a broadcast message in response to the SIM card not being electrically coupled to the server device, wherein the server receives an indication signal from the plurality of client devices in response to the transmitted broadcast message; and a message serializer and router unit processing the commands for transmission to the SIM card, and associating the responses to the commands with address information for transmission of the responses to a client device of the plurality of client devices corresponding to the address information.

7. A mobile telecommunications system for communicating with a plurality of client devices transmitting commands along a local link to a SIM card and receiving responses to the commands from the SIM card transmitted along the local link, comprising:

a server device transferring the commands from the local link to the SIM card, and transferring the responses to the commands from the SIM card for transmission along the local link, the server device transmitting a broadcast message in response to the SIM card not being electrically coupled to the server device, wherein the server receives an indication signal from the plurality of client devices in response to the transmitted broadcast message; and a timer determining the amount of time between the transmission of the commands by the server device to the SIM card and receipt of the responses to the commands from the SIM card by the server device, wherein the commands are discarded in response to the timer exceeding a predetermined period of time.

8. The mobile communications system of claim 7, wherein the timer is positioned within the message serializer and router unit.

9. A mobile telecommunications system for communicating with a plurality of client devices transmitting commands along a local link to a SIM card and receiving responses to the commands from the SIM card transmitted along the local link, comprising:

a server device transferring the commands from the local link to the SIM card, and transferring the responses to the commands from the SIM card for transmission along the local link, the server device transmitting a broadcast message in response to the SIM card not being electrically coupled to the server device, wherein the server receives an indication signal from the plurality of client devices in response to the transmitted broadcast message;

a first transceiver performing local link and address management and authentication of the commands from the plurality of client devices; and a first data interface formatting the commands from the first transceiver and converting the responses to the commands from the SIM card and the broadcast message to a format corresponding to the first transceiver, wherein the first transceiver transmits the broadcast message and the responses to the commands from the first data interface to the plurality of client devices along the local link.

10. The mobile telephone system of claim 9, further comprising:

a command processor formatting the valid commands from the message serializer and router unit for receipt by the SIM card;

a response processor formatting the responses to the commands from the SIM card for receipt by the message serializer and router unit; and a response formatter formatting the responses to the commands and address information from the message serializer and router unit for receipt by the first data interface.

11. The mobile telecommunications system of claim 9, further comprising a command/response interface, positioned within the plurality of client devices, converting internal information to form the commands and linking the responses to the commands with the internal information.

12. The mobile telecommunications system of claim 11, further comprising:

a second transceiver, positioned within the plurality of client devices, performing local link and address management and authentication of the broadcast message and the responses to the commands received from the first transceiver; and a second data interface, positioned within the plurality of client devices, converting the commands to a format corresponding to the second transceiver and converting the broadcast message and the responses to a format corresponding to the command/response interface, wherein the second transceiver transmits the commands from the second data interface to the first transceiver along the local link.

13. A mobile telecommunications system for communicating with a plurality of client devices transmitting commands along a local link to a SIM card and receiving responses to the commands from the SIM card transmitted along the local link, comprising:
 a server device transferring the commands from the local link to the SIM card, and transferring the responses to the commands from the SIM card for transmission along the local link, the server device transmitting a broadcast message in response to the SIM card not being electrically coupled to the server device, wherein the server receives an indication signal from the plurality of client devices in response to the transmitted broadcast message; and
 a timer, positioned within the plurality of client devices, determining the amount of time between the commands being transmitted by the plurality of client devices and the receiving of the responses to the commands from SIM card by the plurality of client devices, the timer transmitting a timeout message in response to the timer exceeding a second predetermined time period.

14. The mobile telecommunication system of claim 13, further comprising a command/response interface, positioned within the plurality of client devices, converting internal information to form the commands and linking the responses to the commands with the internal information, wherein the timer is positioned within the command/response interface.

15. The mobile communications system of claim 13, further comprising a physical presence processor, positioned within the plurality of client devices, transmitting the indication signal in response to receipt of the broadcast message and in response to the timeout message.

16. An apparatus enabling a plurality of client devices to access a SIM card, coupled to a server device, along a local link, comprising:
 a SIM card interface, coupling the SIM card to the server device, formatting the commands from the plurality of client devices for transmission to the SIM card, and formatting responses to the commands for transmission from the SIM card to the plurality of client devices, the SIM card interface transmitting a physical presence signal in response to the SIM card being coupled to the SIM card interface; and
 a router unit routing the commands from the server device to the SIM card interface, and routing the responses to the commands for transmission along the local link from the SIM card to the plurality of client devices, the router unit transmitting a broadcast message along the local link in response to detecting the physical presence signal transmitted by the SIM card interface.

17. The apparatus of claim 16, further comprising a client address manager determining whether the local link addresses associated with the commands correspond to permitted client devices and whether a number of allowed client devices has been exceeded, to form valid commands.

18. The apparatus of claim 17, wherein the number of allowed client devices is contained in an answer to reset response transmitted from SIM card to the plurality of client devices.

19. The apparatus of claim 17, further comprising a command queue buffer receiving and storing the valid commands formed by the client address manager in order of receipt.

20. The apparatus of claim 19, further comprising a message serializer and router unit processing the valid commands from the command queue buffer for transmission to the SIM card, and associating the responses to the commands from the SIM card with client device address information for transmission of the responses to a client device of the plurality of client devices corresponding to the address information.

21. The apparatus of claim 20, further comprising a first timer determining the amount of time between the transmission of the valid commands by the router unit to the SIM card and receipt of the responses to the valid commands from the SIM card, wherein the router unit discards the valid commands in response to the timer exceeding a first predetermined period of time.

22. The apparatus of claim 21, wherein the first timer is positioned within the message serializer and router unit.

23. The apparatus of claim 21, further comprising:
 a first transceiver performing local link and address management and authentication of the commands received by the server device from the plurality of client devices; and
 a first data interface converting the commands from the first transceiver to a format corresponding to the client address manager, the first data interface converting the responses to the commands from the message serializer and router and the broadcast message to a format corresponding to the first transceiver, wherein the first transceiver transmits the broadcast message and the responses to the commands from the first data interface to the plurality of client devices along the local link.

24. The apparatus of claim 23, further comprising:
 a command processor formatting the valid commands from the message serializer and router unit for receipt by the SIM card;
 a response processor formatting the responses to the commands from the SIM card for receipt by the message serializer and router unit; and
 a response formatter formatting the responses to the commands and address information from the message serializer and router unit for receipt by the first data interface.

25. The apparatus of claim 24, further comprising a command/response interface, positioned within the plurality of client devices, converting internal information to form the commands and linking the responses to the commands with the internal information.

26. The apparatus of claim 25, further comprising an addresser associating the local link addresses with commands transmitted along a local link from the plurality of client devices to the server device along a local link.

27. The apparatus of claim 26, further comprising a physical presence processor positioned within the plurality of client devices transmitting an indication signal within the plurality of client devices in response to receipt of the broadcast message.

28. The apparatus of claim 27, further comprising:
 a second transceiver, positioned within the plurality of client devices, performing local link and address management and authentication of the broadcast message and the responses to the commands received from the first transceiver; and
 a second data interface, positioned within the plurality of client devices, receiving the commands and associated local addresses from the addresser, and the broadcast message and the responses to the commands from the second transceiver, and converting the broadcast message and the responses to a format corresponding to the command/response interface, and converting the commands to a format corresponding to the second transceiver, wherein the second transceiver transmits the commands from the second data interface to the first data interface along the local link.

29. The apparatus of claim 28, further comprising a second timer, positioned within the plurality of client devices, determining the amount of time between the commands being transmitted by the second transceiver to the first transceiver and the receipt of the responses to the commands from the first transceiver, the second timer transmitting a timeout message in response to the second timer exceeding a second predetermined time period.

30. The apparatus of claim 29, wherein the second timer is positioned within the command/response interface.

31. The apparatus of claim 29, further comprising a physical presence processor, positioned within the plurality of client devices, transmitting the indication signal in response to receipt of the broadcast message, wherein the physical presence processor interrupts the transmission of the indication signal in response not receiving the broadcast signal and in response to the timeout message.

32. The apparatus of claim 31, wherein the local link is a wireless local link.

33. A method of enabling a client device to access a SIM card coupled to a server device, comprising the steps of:

associating a local address of the client device with a command for transmission to the SIM card and transmitting the command and the local address along a local link from the client device to the server device;

determining whether the client device is a permitted client device based on the local address; and transferring the command to the SIM card, formatting a response to the command received from the SIM card, and routing the formatted response for transmission to the client device along the local link.

34. The method of claim 33, further comprising the steps of:

determining whether the response is received by the client device within a predetermined time period; and transferring a timeout message within the client device in response to the response not being received by the client device within the predetermined time period.

35. The method of claim 33, wherein the step of determining whether the client device is a permitted client device comprises comparing the local address with a list of local addresses corresponding to permissible client devices.

36. The method of claim 33, wherein the step of determining whether the client device is a permitted client device includes determining whether the server device has more than a maximum number of permissible client devices currently attached.

37. The method of claim 33, further comprising the steps of:

determining whether the response to the command from the SIM card is received by the server device in a predetermined time period; and discarding the command in response to the response to the command from the SIM card not being received within the predetermined time period.

38. The method of claim 33, further comprising the steps of:

transmitting a broadcast message along the local link from the server device to the client device in response to the SIM card not being coupled to the server device; and transmitting an indication signal within the client device in response to the transmitted broadcast signal.

39. The method of claim 38, further comprising the steps of:

determining whether the formatted response is received by the client device within a predetermined time period;

transferring a timeout message within the client device in response to the formatted response not being received by the client device within the predetermined time period and transmitting the indication signal in response to the timeout message.

* * * * *